Patented Feb. 9, 1932

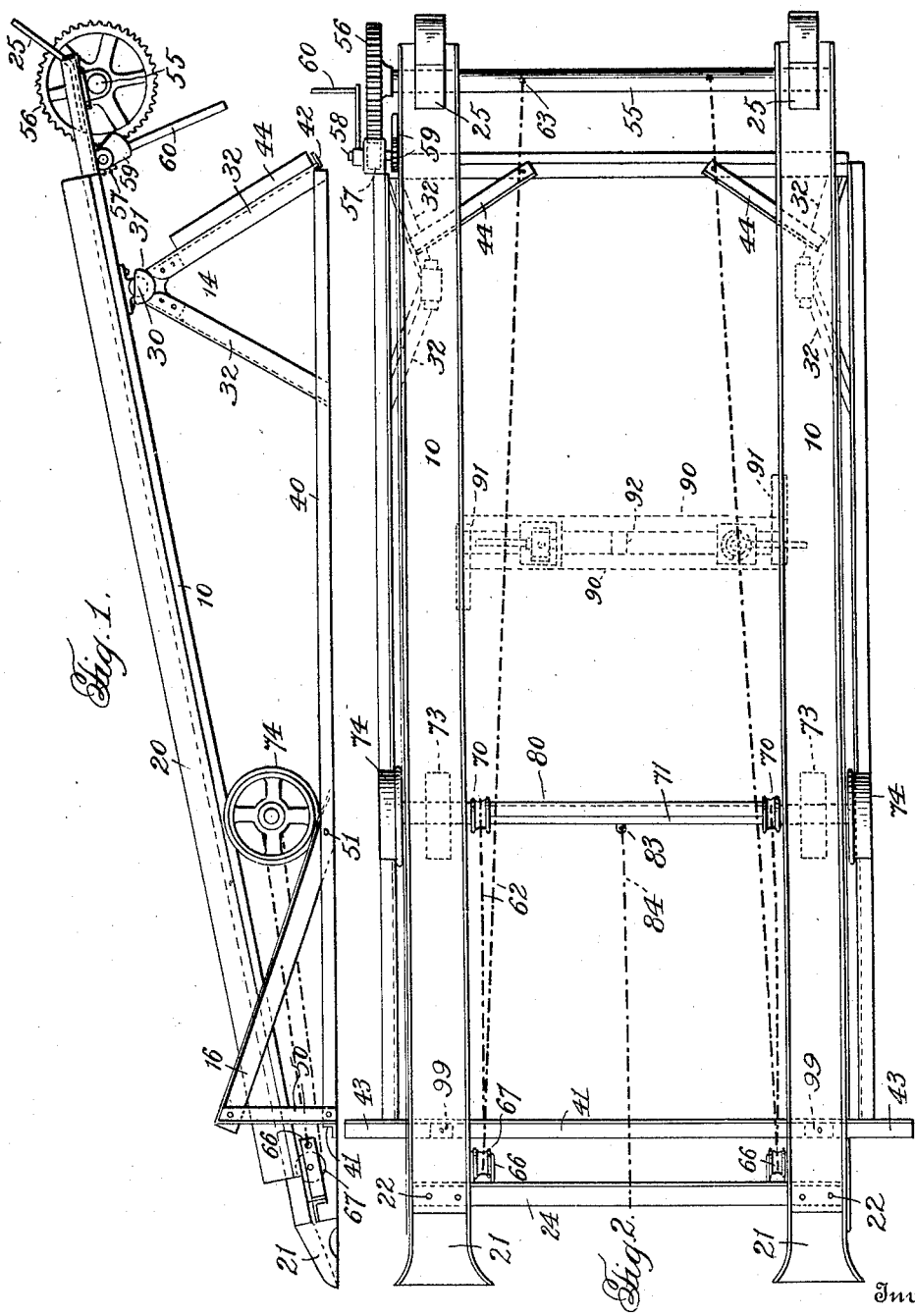

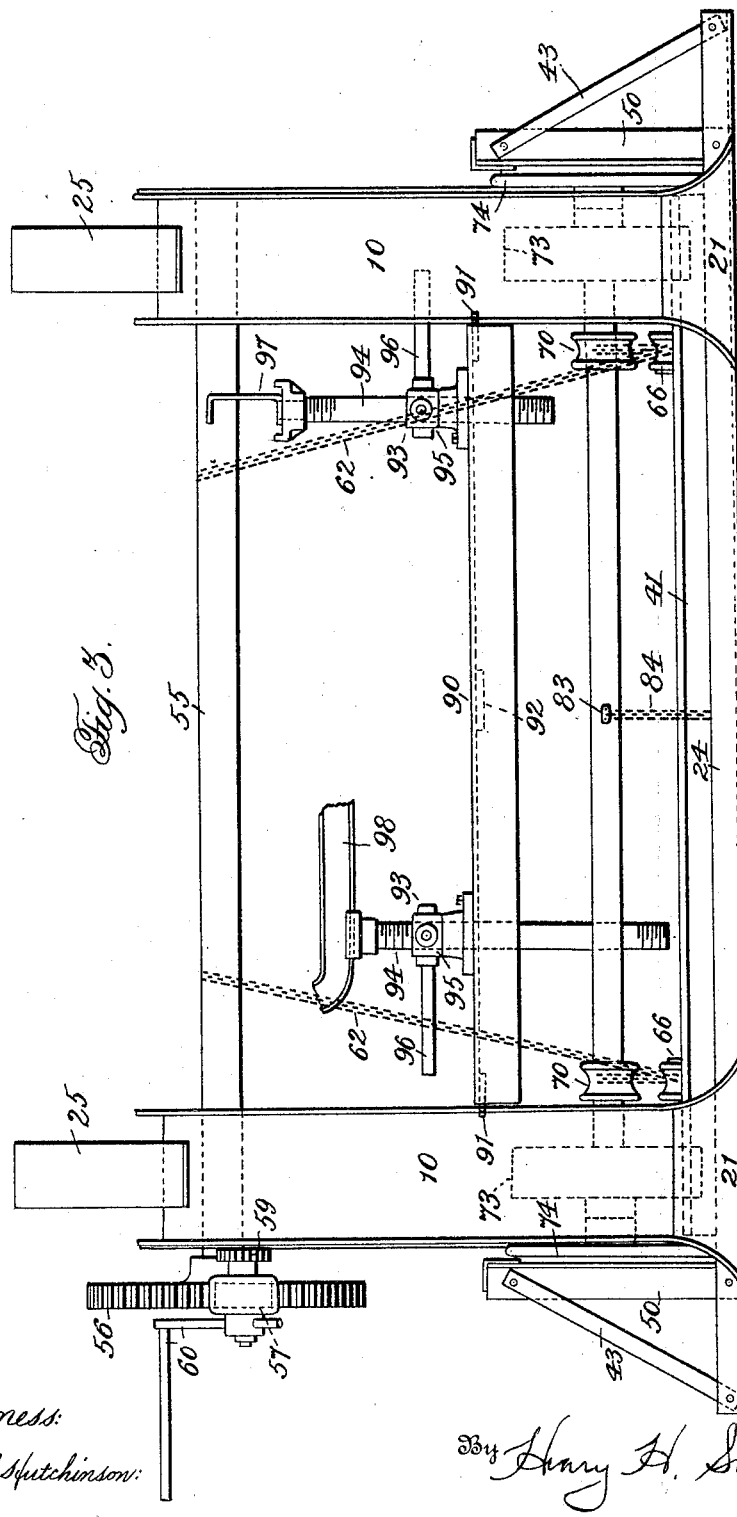

1,844,584

UNITED STATES PATENT OFFICE

ROBERT E. MANLEY, OF YORK, PENNSYLVANIA, ASSIGNOR TO MANLEY MANUFACTURING COMPANY, OF YORK, PENNSYLVANIA, A CORPORATION OF DELAWARE

AUTO PIT

Application filed September 26, 1925. Serial No. 58,397.

This invention relates to automobile elevating devices, and has for its principal object the provision of a runway which will provide an auto pit in a restricted space.

Another object of the present invention consists in the provision of an auto pit in which a heavy automobile can rapidly be elevated and which provides a clear space throughout the entire center of the device, so that the workman is not hampered by obstructions while repairing the car from the bottom.

A further object of the invention is the provision of means for elevating an automobile above a pit for such operations as changing the springs or adjusting cars which have four wheel brakes.

Owing to the likelihood of danger due to persons falling into such an excavation the use of actual pits dug in the ground for repairing automobiles is rapidly becoming obsolete. Where there is ample room a simple and easy way out of the difficulty lies in the provision of what is known as a service runway consisting of a horizontal track way for each side of the automobile, which trackways have a rather long incline up which the automobile is driven by its own power.

It very frequently happens, however, that the amount of space available in front of the garage, or within it, is not sufficiently great to accommodate a long service runway, and it is therefore necessary to design some method of elevating an automobile readily and quickly, and yet without expensive mechanism or difficult operation, and with this need in view the present device was designed.

In the drawings:

Figure 1 is a side elevation.
Figure 2 is a top plan view.
Figure 3 is a vertical section.

The auto pit consists mainly of a base made up of a pair of channels 10, braced at front and back to form a hollow rectangular frame, and a bed or support likewise formed of a rectangular frame having at its rear end a pair of trusses 14, which forms the pivot of the runway, and having at its front end a sloping track 16. The wheel receiving members 10 are formed generally of standard channel section, but due to the rather great distance between the supports when a car is elevated and to insure a satisfactory factor of safety with very heavy cars I prefer to reinforce the usual channel members by securing to the upper edge of each a strip 20 which may be riveted or bolted to one side flange of the channel, as best seen in Figure 3.

At the forward end each of the channels has an entry piece 21, preferably a separate casting which may be secured to the channel by the bolts 22, which also secure the front transverse member 24 which is preferably of angle iron. At the rear end of the channels each have a short upwardly bent strip 25 inserted merely as a buffer or stop to prevent an automobile being driven too far to the rear. It might be remarked here, however, that it is quite convenient to run an automobile right up to this stop member 25, as by so doing the weight that must be lifted is reduced to a minimum, since the car is never backed up the track and the engine, which is the heaviest part of the automobile is therefore passed somewhat forwardly of the pivot 30 so that the major part of the weight of the car is balanced over the trusses. The pivot 30 is a casting bolted to the bottom of the channel, and rests in a cup 31 carried at the top of the two angles 32 which form the truss 14.

The bed or part which engages the floor is composed of a pair of longitudinal angles 40 preferably somewhat shorter than the channels and tied at their front and rear ends by angle pieces 41 and 42, respectively. The former conveniently extends beyond the channel members at each side to provide for bracing members such as 43 to take care of the side thrusts occurring by reason of careless driving. The rear transverse angle 42 is preferably tilted so that one of its flanges shall be parallel to the rear member 32 of the truss, thus supplying convenient assembly of the struts 44 which are merely sloping braces. A short upright 50 bolted or riveted to the bars 43 forms a support for the trackway 16, which is bolted at its rear end as at 51 to the side bar 40.

The elevating mechanism by means of which the front end of the runway is raised about its pivot 30 may be in form of winch or windlass, but is conveniently formed of a pipe or tubing 55 journaled at the rear end of each of the channels 10, and having at its free end to one side a large gear 56 driven from a small pinion 57 on a stud shaft 58, and carrying the usual pawl and ratchet mechanism 59, the handle of the stud shaft being shown at 60 as of the variable length type, so that in case the pit should be used for a small truck or very heavy passenger car it would be possible to shorten the lever, thereby reducing the amount of power required to raise such heavy vehicle. The chains 62 are secured to the tube 55, which serves a drum, by means of lugs 63 which are spaced sufficiently far from the inner edges of the drum that when the bed has been raised to its highest point the chain will just clear the flange of the channel, and therefore be as far as possible out of the way of the workmen operating between the rails 10.

The free end of each of these chains 62 is secured at 66 about a frame carrying a chain pulley wheel 67 which guides the chain back to the drum or pipe 55 after passing over the chain pulley block 70 mounted loosely on an axle 71, which also loosely carries at each end a flat wheel 73, and a flanged wheel 74. Each of the latter rides on the inclined track 16 as the chain is wound on the drum 55 while the flat wheel 73 revolves in opposite direction to support and raise the free ends of the channels. I find it very convenient to secure a small strengthening angle 80 to the dead axle 71 partly for strength and partly to properly space the two chain pulleys 70.

Through the axle 71 and angle piece 80 I pass a small eye bolt 83 to which I secure a chain 84 serving as a safety first feature by means of which when the pit is raised the axle 71 is chained to the front transverse channel 24, so that in case either chain should break or the pawl should slip the elevated automobile would not be discharged from the pit. This obviously is an optional feature but very convenient in practice.

Should it be desired to change the springs or in case the automobile is equipped with four wheel brakes and these need adjusting it is necessary to elevate the car above the channels and for this purpose I provide a jack consisting of a pair of transverse members 90 of such length as just to fit between the two channels and secured together by longitudinal flats 91 extending forwardly on one side and rearwardly on the other, as shown in Figure 2. I brace this frame in the center as at 92 and midway between this central brace and the end flats 91 I secure a pair of jacks 93, preferably of the type in which the jack stem 94 is threaded and is raised and lowered by a large nut 95 operated by a handle such as 96.

In Figure 3 I have shown the jack at the right hand as elevated quite high and engaging the frame 97 of a car, while the jack at the left hand is shown at a lowered position as engaging a front axle 98.

The operation of the device is as follows:— The car to be raised is driven under its power up the two channels 10. The entrance pieces 21 are flared to considerable extent to insure proper guidance of the automobile into the runway and the reinforcing strips 21 also prevent running of the car out of its trackway. When the car has reached the rear stop 25 the brakes are put on and the handle 60 is turned winding the chain 62 about the drum or pipe 55. This pulls the axle 71 towards the pulley 67 at the front end of the inclined track 16, and causes the flat wheel 73 to engage the bottom of the channel 10 at the same time. As the chain is wound further the flange wheels 74 ride up the incline, and since the flat wheels 73 are on the same axle they cause the channels to rise about the pivots 30 at the rear. The chain is wound upon the drum until the flat wheels 73 strike the heavy stops 99 bolted to the bottom of the channels at which time the runway is exactly horizontal. The pawl and ratchet mechanism 59 is sufficient to maintain the pit in this position, but it is convenient to secure a chain 84 to the transverse member 24 which holds the axle 71 in place until it is desired to lower the car. Because of the placing of the pivot 30 a considerable distance from the stop 25 and largely because the engine is over the space between these two members the amount of leverage required is very small and it is not at all necessary to provide a reverse pawl for lowering the car when the work is finished, as the car can be lowered with the greatest of ease by the handle 60 with the pawl thrown back. If the car is to be jacked up above the track, the frames 90, one or more as needed, is slid into place and the car jacked up in the usual manner.

What I claim is:—

1. In an auto pit for elevating an automobile for under chassis work, the combination with a runway for receiving an automobile, of means for pivotally supporting one end of said runway, a track slanting upward away from said pivotal support, and elevating means including two independent coaxial wheels one of which engages the runway while the other engages the track.

2. In an auto pit, the combination with a runway including two parallel channel beams forming tracks for receiving the wheels of an automobile, of means for pivotally supporting one end of said runway in an elevated position, a track slanting upward away from said pivotal support, and elevating means including two independent coaxial wheels one of which engages the runway while the other engages the track, and a winch on the runway operative upon said elevating means to raise the lower end of the inclined runway until the runway is in the horizontal position.

3. In a portable auto pit, a pair of channels braced at front and back to form a hollow rectangular runway frame, a bed consisting of a hollow rectangular frame, a pair of trusses rising from the bed, means for pivoting the runway at the top of the trusses, a flared entry piece for each channel, an inclined track rising from the bed at the front end thereof at each side, a transverse shaft, a flanged wheel on said shaft engaging each inclined track, a wheel under and engaging each channel and means for moving the transverse shaft away from the pivotal support.

4. The device of claim 3 in which the transverse shaft is strengthened by a member which spaces the channel engaging wheels 5. The device of claim 3 in which the means for moving the transverse shaft includes a pulley at the front end of the runway and a chain connected to the transverse shaft and adapted to pass around the pulley and be secured to the rear of the pit.

6. The device of claim 3 in which the means for moving the transverse shaft includes a drum at the rear of the runway frame, a pair of chains secured to the drum, a pulley at the front end of each runway channel, said chains secured to each side of the transverse shaft and adapted to extend forwardly to the proximate pulley and then rearwardly to the drum.

7. In an auto pit for elevating an automobile for under chassis work, the combination with a runway including two parallel channel beams forming tracks for receiving the wheels of an automobile, of means for pivotally supporting one end of said runway in an elevated position, a track slanting upward away from said pivotal support, and elevating means having rolling engagement with the beams and with the upward slanting track.

8. The device of claim 7 in which the elevating means is controlled from the elevated rear end of the runway.

9. The device of claim 7 in which the track consists of two parallel pieces, one adjacent one channel and the other adjacent the other channel, means for holding the track against movement with respect to the pivoting means, transverse means for holding the track pieces in spaced relation, a drum joining the elevated ends of the two channels, and flexible means closely adjacent the sides of the channels and extending to the ground engaging ends of the channels, connecting the drum and the elevating means.

10. The device of claim 7 in which the elevating means includes a transverse shaft carrying three wheels one engaging one channel, a second engaging the other channel, and a third wheel engaging the track.

11. In a portable auto pit, an automobile runway, a bed, a pivotal support for the runway at each rear corner of the bed, an inclined track at each front corner of the bed, wheeled means engaging the runway and each inclined track for elevating the front end of the runway to horizontal position so as to make convenient the performing of under chassis work upon the automobile, and means beneath the runway for moving the wheeled means, said means beneath the runway including two flexible members each over one side edge of the bed so as to leave a large unobstructed central space for the workman.

12. An auto pit including a hollow rectangular frame the side members of which are inclined channels the flanges of which provides guides for the wheels of an automobile, means for pivotally supporting one end of said frame in an elevated position, incline means slanting upwardly away from said support, elevating means consisting of a shaft having two pairs of wheels thereon, one wheel of each pair riding on the incline and the other wheel being free to rotate in the opposite direction in contact with the proximate channel when said means is forced up the incline to elevate the said end of the frame to a horizontal position, and a winch mounted on the upper ends of the frame for operating said elevating means, said winch including a shaft-drum extending crosswise of the frame and a pair of chains secured thereto between the side members of the frames extending downwardly toward the other end of the frame and having connections with said elevating means, said chains normally extending in the space between the side members but movable outward away from each other to a position closely adjacent the side members as the shaft-drum is rotated to wind the chains thereon for raising the lowered ends of the channel to an elevated position.

In testimony whereof I affix my signature.

ROBERT E. MANLEY.